UNITED STATES PATENT OFFICE.

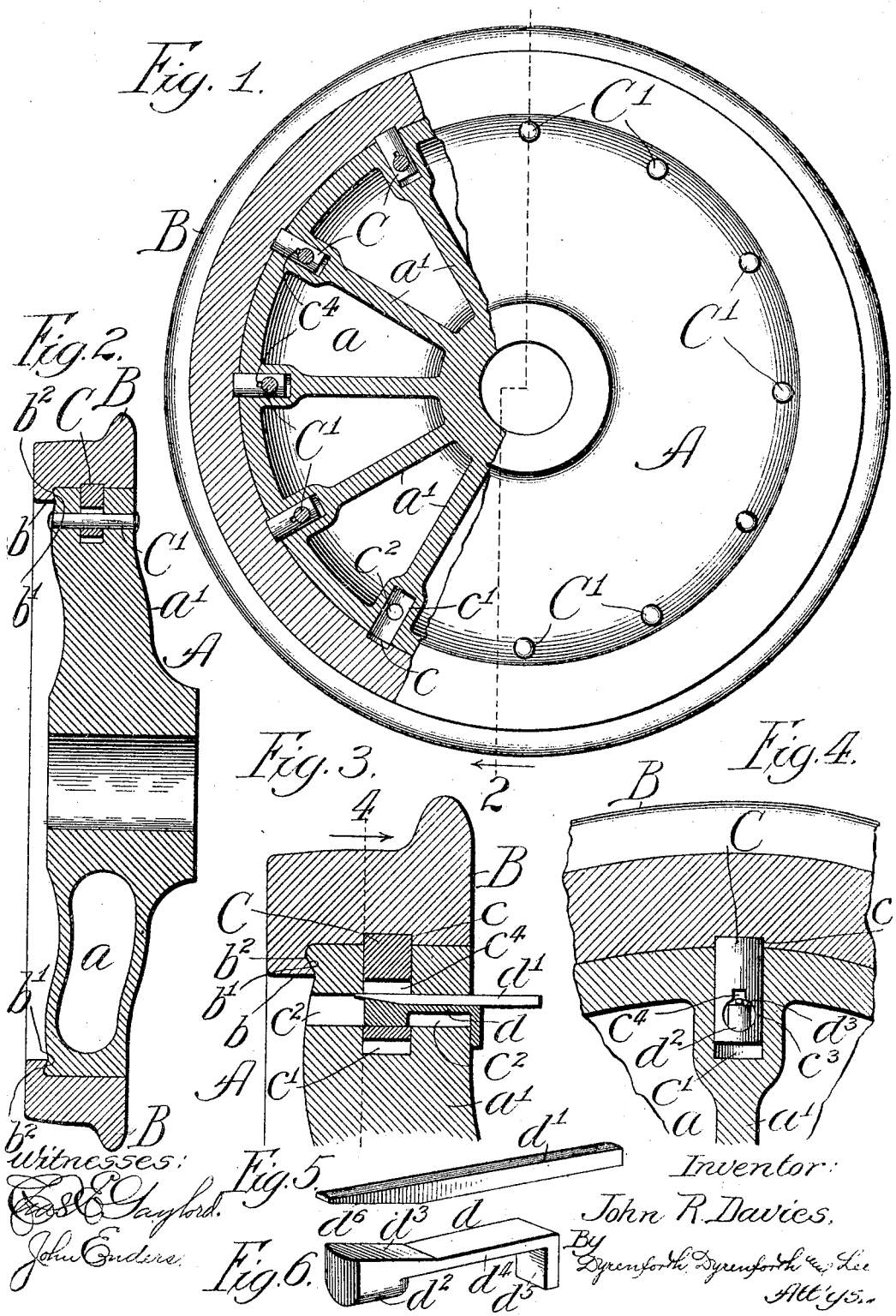

JOHN R. DAVIES, OF WAUKEGAN, ILLINOIS, ASSIGNOR TO DAVIES CAR WHEEL AND MACHINE COMPANY, OF CHICAGO, ILLINOIS, A CORPORATION OF ILLINOIS.

CAR-WHEEL.

No. 799,893.   Specification of Letters Patent.   Patented Sept. 19, 1905.

Application filed January 14, 1905. Serial No. 241,010.

*To all whom it may concern:*

Be it known that I, JOHN R. DAVIES, a citizen of the United States, residing at Waukegan, in the county of Lake and State of Illinois, have invented a new and useful Improvement in Car-Wheels, of which the following is a specification.

My invention relates particularly to car-wheels having detachable ties, such as are illustrated in my Patent No. 469,681, granted March 1, 1892.

My primary object is to provide such connections between the center and tire of a wheel of this character as will enable detachment of the tire to be made without the necessity of drilling holes therein, an operation which results in destruction of the tire as well as in undue expense in effecting its removal.

The invention is illustrated in the accompanying drawings, in which—

Figure 1 represents a view of my improved wheel, partly in side elevation and partly in section; Fig. 2, a section taken as indicated at line 2 of Fig. 1; Fig. 3, an enlarged broken section showing the manner of withdrawing a dowel from engagement with the tire; Fig. 4, a section taken as indicated at line 4 of Fig. 3, and Figs. 5 and 6 perspective views of tools employed in effecting withdrawal or sheathing of the dowels to permit removal of the tire.

In the preferred construction, which is herein illustrated, A represents a wheel-center; B, the detachable tire therefor, and C dowels connecting the tire and wheel-center and normally secured in place by keys C'.

The wheel-center and tire may be of any approved construction. Preferably the center is cast in the usual way with chambers $a$, separated by ribs or spokes $a'$, and the tire is provided internally near its outer (with respect to the car and track) edge with an annular flange $b$, which is undercut or beveled to afford a retaining-lip $b'$, with which engages a corresponding lateral annular lip $b^2$, with which the wheel-center is provided at its periphery. By preference a dowel is provided at the outer extremity of each of three or more spokes, the tire being provided internally with a series of radial recesses $c$ and the wheel-center with a corresponding series of registering radial recesses $c'$, which are occupied by the dowels. One of the dowels has been removed in Fig. 1 the better to show the arrangement. Intersecting each radial recess $c'$, near the inner end thereof, is a transverse perforation or channel $c^2$, which preferably extends entirely through the wheel-center, and each dowel is provided near its inner end with a transverse key-receiving perforation or channel $c^3$, which normally registers with the corresponding channel $c^2$, said channels normally receiving the corresponding key C'. Each dowel is provided, further, with a relatively narrow wedge-accommodating recess $c^4$, which opens into the channel $c^3$ at the upper side thereof. The keys are preferably round pins, whose ends are upset or riveted to prevent accidental withdrawal. It is to be noted that each key fits its seat in the corresponding dowel accurately, except for the wedge-accommodating recess, which, however, does not interfere with the security of the lock upon the dowel.

In the application of the tire the dowels are withdrawn or completely sheathed, and after the tire is in place the dowels are forced outwardly or projected to lock the tire to the wheel-center by inserting any suitable wedge implement through the transverse perforations. Thereupon the keys are inserted and securely riveted to lock the dowels. The tire is usually shrunk upon the center, giving the added security due thereto. When it is desired to remove a tire, the keys are driven out and a pair of wedge implements $d$ $d'$ employed to effect retraction or sheathing of the dowels. The tool $d$ has a head comprising a rounded nose or lug $d^2$ and an opposed wedge-surface $d^3$, a shank $d^4$, and a lateral gage-lug $d^5$. The head is adapted to enter the perforation or bearing in the dowel, and the nose is of a shape and size permitting it to enter the lower portion of the recess $c'$ as the wedge $d'$ is driven home. The wedge $d'$ is a narrow bar having a wedge-surface $d^6$, adapted to engage the surface $d^3$. It is evident that as the wedge $d'$ is forced in the dowel will be retracted, the recess $c^4$ accommodating the wedge as the dowel recedes.

Any suitable means may be employed for engagement with the transverse channels of the dowels to effect projection and locking of the dowels and retraction of the same when desired. It is not essential to my invention in its broadest aspect that different or distinct means be employed for accomplishing the several results mentioned, as the gist of my invention lies in providing means near the inner ends of the dowels for effecting their retraction through the medium of any suitable devices engaging the dowels. This enables the tire, by far the most expensive part of the wheel, to be saved in case of injury to the center and facilitates and cheapens the operation of removing the tire.

It is noteworthy that the flange connection between the wheel-center and tire is at the edge of the tire opposite the edge which is provided with the usual rail-engaging flange. Thus the lateral thrust upon the tire through the wheel-center is met largely by the flange connection.

Changes in form and details of construction are contemplated. Hence no undue limitation should be understood from the foregoing detailed description.

What I regard as new, and desire to secure by Letters Patent, is—

1. The combination with a wheel-center and tire having registering recesses, of a dowel-pin joining said parts having its inner end equipped with a bearing through which pressure may be exerted in drawing the dowel-pin inwardly to free it from engagement with the tire, for the purpose set forth.

2. The combination with a tire having internal recesses, and a center having registering recesses and transverse channels intersecting the same, of dowel-pins having stems provided with transverse channels, and means entered in said transverse channels and securing the dowel-pins in place, for the purpose set forth.

3. The combination with a tire having internal recesses, and a center having registering recesses and transverse channels intersecting the same, of dowels having transverse key-receiving channels and narrower wedge-receiving channels opening thereinto, and keys securing said dowels in place, the wedge-receiving channels serving to accommodate a relatively narrow wedge in the operation of withdrawing the dowel, for the purpose set forth.

4. The combination of a tire having at one edge an external rail-engaging flange and at the opposite edge an internal center-engaging flange, a wheel-center engaging said second-named flange, normally projected radial dowels connecting the tire and center and provided within the center with transverse channels, and dowel-locking keys entered in said transverse channels, for the purpose set forth.

5. The combination of a tire having, in integral formation, at one edge an external rail-engaging flange and at the opposite edge an internal center-engaging flange, a wheel-center engaging said second-named flange, normally projected radial dowel-pins connecting the tire and center and provided within the center with bearings through which force may be exerted to retract the dowel-pins, and transverse dowel-locking keys carried by the wheel-center, for the purpose set forth.

JOHN R. DAVIES.

In presence of—
F. M. WIRTZ,
J. H. LANDES.